United States Patent [19]

Wei

[11] Patent Number: 5,825,158

[45] Date of Patent: Oct. 20, 1998

[54] CHARGING DEVICE WITH ROTATABLE POWER INLET

[75] Inventor: Jung-Kuei Wei, Taoyuan, Taiwan

[73] Assignee: Modern Electric Co., Ltd., Taoyuan, Taiwan

[21] Appl. No.: 834,743

[22] Filed: Apr. 3, 1997

[51] Int. Cl.$^6$ ................................................. H01M 10/46

[52] U.S. Cl. .......................................... 320/111; 320/113

[58] Field of Search .................................... 320/107, 110, 320/111, 112, 113, 115, 135, 160, 101, 104; 439/333, 456, 457, 504

[56] References Cited

U.S. PATENT DOCUMENTS

| | | | |
|---|---|---|---|
| 5,121,047 | 6/1992 | Goedken et al. | 320/160 |
| 5,254,927 | 10/1993 | Chiang | 320/107 |
| 5,552,692 | 9/1996 | McKillop | 320/166 |
| 5,592,064 | 1/1997 | Morita | 320/110 |

*Primary Examiner*—Edward Tso
*Attorney, Agent, or Firm*—Browdy & Neimark

[57] ABSTRACT

A charging device includes a charging circuit having a power inlet and a power outlet which is preferably connected to the charging circuit by means of a cable. An adaptor which is adapted to electrically connect to a given external power source, such as a wall outlet or a cigarette lighter holder provided on the control panel of an automobile, has a connection portion for releasable connection with the power inlet of the charging circuit for supplying electricity from the power source to the charging circuit. The adaptor may be provided with a voltage transformer to allow the charging circuit to be used with external power source of different voltage outputs. A battery holder has a connection portion for releasable connection with the power outlet of the charging circuit to supply the output of the charging device to the battery holder. The battery holder defines therein at least one battery receptacle for receiving and holding therein a battery to be charged with an electrical connection established between the battery and the connection portion of the battery holder when the battery is received within the battery receptacle so as to have the battery charged.

3 Claims, 5 Drawing Sheets

5,825,158

CHARGING DEVICE WITH ROTATABLE POWER INLET

FIELD OF THE INVENTION

The present invention relates generally to a charging device and in particular to a charging device that is compatible with different power supply and capable to accommodate and charge batteries or cells or different designs and different kinds.

BACKGROUND OF THE INVENTION

Mobile phones have been prevailing recently. Most of the mobile phones are powered by rechargeable or secondary batteries. Charging the rechargeable batteries is usually carried out with a charger. Since different mobile phones use batteries of different specifications, a charger that is designed for a specific battery or a specific mobile phone cannot be used to charge batteries of other mobile phones. This causes inconvenience for the mobile phone users.

For most of the mobile phones, the batteries are operated with substantially the same voltage. The difference is in the design of the connector portion for connecting the batteries to the charger. Thus, if a universal connector is provided which allows the charger to connect to different designs of batteries, then a single charger may be used to charge batteries of different designs.

Furthermore, regular-sized batteries, such as AA or AAA size, are also different from the mobile phone batteries. Thus a different charger is needed to charge the regular-sized batteries. In addition, the most common power source that is available in the daily living is the wall outlet and automobile electricity system. The former is usually 110 V or 220 V alternate current, while the latter 12 V or 24 V direct current. To charge batteries with these two different power systems, two different chargers are needed.

All these lead in one situation, that is to have a handy and efficient charging operation, one need a number of different chargers. This is quite inconvenient and troublesome.

SUMMARY OF THE INVENTION

The principal object of the present invention is to provide a battery charging device which is suitable for charging batteries of different specifications.

Another object of the present invention is to provide a universal charging device wherein different adaptors are exchangeably provided so as to have the charging device connectable with different power supply systems.

A further object of the present invention is to provide a universal charging device wherein different battery holders are exchangeably provided for holding and connecting batteries of different specifications to the charging device.

A further object of the present invention is to provide a battery charging device wherein a resistor is provided to be parallel with the output terminals of the charging device, serving as an automatic detection device, for controlling the output voltage of the charging device in correspondence with the specification of the battery to be charged, the resistor being exchangeable with resistors of different resistances for accommodating batteries of different specifications.

Thus, in accordance with the present invention, there is provided a charging device comprising a charging circuit having a power inlet and a power outlet which is preferably connected to the charging circuit by means of a cable. An adaptor which is adapted to electrically connect to a given external power source, such as a wall outlet or a cigarette lighter holder provided on the control panel of an automobile, has a connection portion for releasable connection with the power inlet of the charging circuit for supplying electricity from the power source to the charging circuit. The adaptor may be provided with a voltage transformer to allow the charging circuit to be used with external power source of different voltage outputs. A battery holder has a connection portion for releasable connection with the power outlet of the charging circuit to supply the output of the charging device to the battery holder. The battery holder defines therein at least one battery receptacle for receiving and holding therein a battery to be charged with an electrical connection established between the battery and the connection portion of the battery holder when the battery is received within the battery receptacle so as to have the battery charged.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
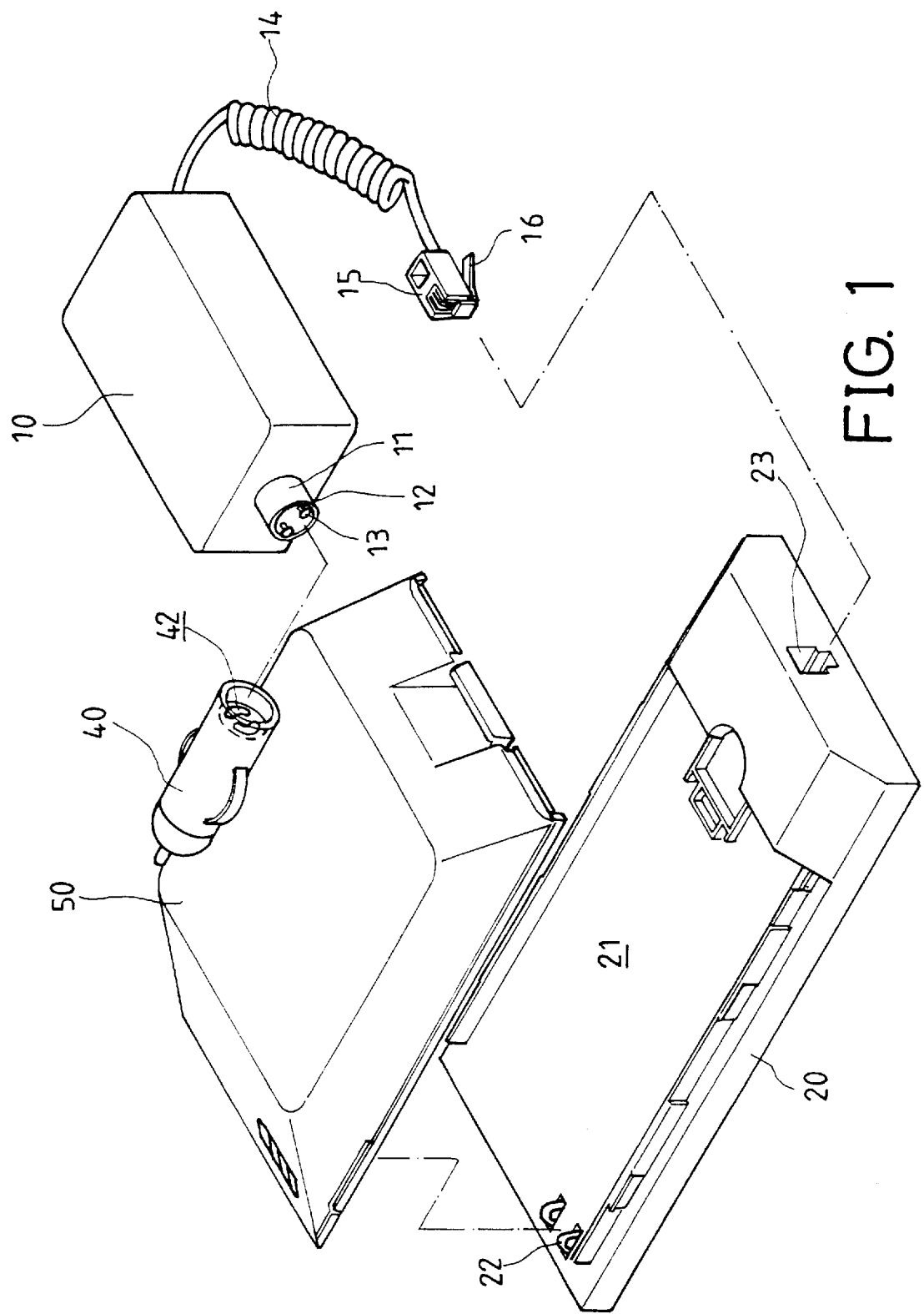
FIG. 1 is an exploded perspective view showing a charging device constructed in accordance with the present invention used to charge a mobile phone battery.

With reference to the drawings and in particular to FIG. 1, wherein a charging device constructed in accordance with the present invention is showing, the charging device comprises a charging circuit housed in a casing 10, the charging circuit 10 is provided with a power inlet 11 and a power output 15. The power inlet 11 is designed to releasably connect to an adaptor 40 for receiving power supply from an external electricity source, such as an automobile electricity system or a wall outlet. In the embodiment illustrated in FIG. 1, the adaptor 40 is configured similar to a cigarette lighter that is commonly seen in an automobile control panel and is removably received in a cigarette lighter holder to be in electrical connection with the automobile electricity system so that the adaptor 40 is receivable in the cigarette lighter holder of the automobile to supply electricity from the automobile electricity system to the charging circuit 10.

Figure 2:
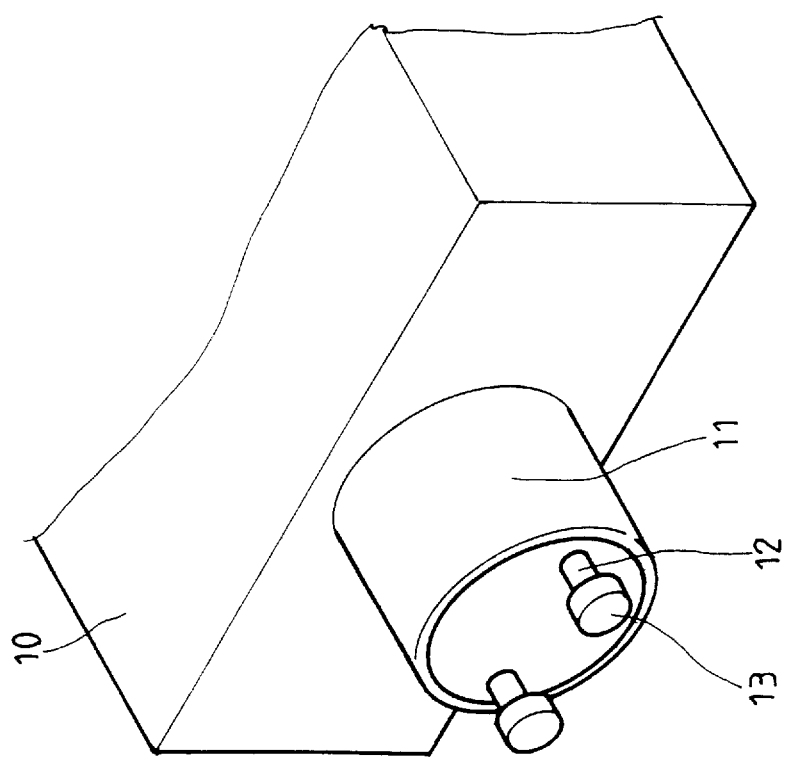
FIG. 2 is a partial perspective view showing a power inlet structure of the charging device in accordance with the present invention.

As more clearly shown in FIG. 2, the power inlet 11 of the charging circuit 10 comprises a cylindrical projection extending in an axial direction having formed on an axial end thereof two pegs 12, each having an expanded end 13. The adaptor 40 is provided, at an end thereof, with a circular recess 41 sized to receive the cylindrical projection of the power inlet 11 therein and to allow the cylindrical projection of the power inlet 11 to be rotatable relative to the adaptor 40.

Figure 3:
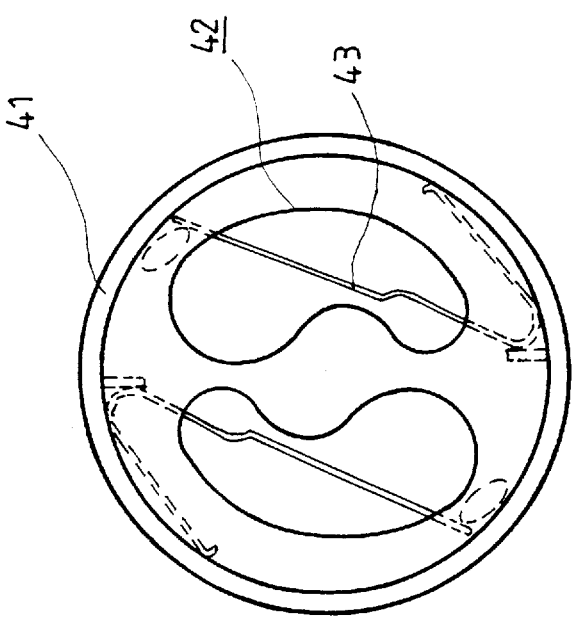
FIG. 3 is a front view showing the connection portion of the adaptor for receiving and holding therein the power inlet of the charging circuit of the present invention.

The bottom of the recess 41 is defined by a plate on which two arc slots 42 are formed (more clearly shown in FIG. 3). The arc slots 42 are substantially concentric with the circular recess 41 and are located to receive the pegs 12 of the power inlet 11 therein and allowing the pegs 12 to move along the arc slots 42 by rotating the adaptor 40 relative to the power inlet 11.

The arc slots 42 have a first end having a width large enough to allow the expanded end 13 of the respective peg 12 to extend therethrough and an opposite second end having a width smaller than that of the first end and the expanded end 13, but large enough to allow the peg 12 to move therein so as to retain the peg 12 therein by contacting and preventing the expanded end 13 of the peg 12 from moving in the axial direction of the cylindrical projection of the power inlet 11. This provides a secure engagement between the adaptor 40 and the power inlet 11 of the charging circuit 10.

Figure 4:
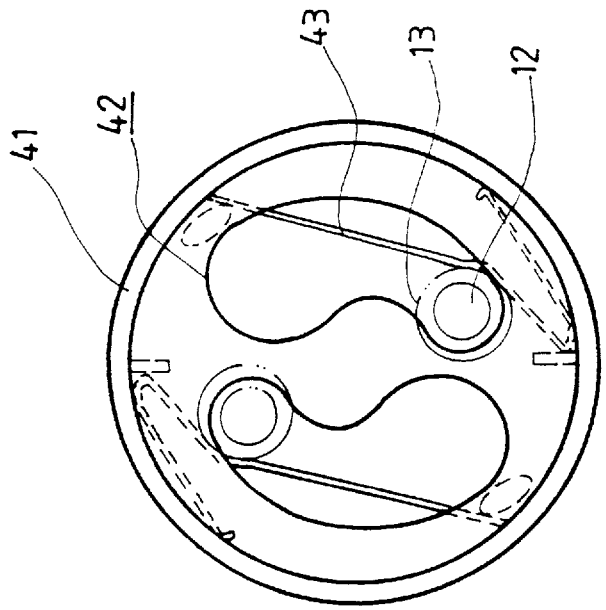
FIG. 4 is a front view similar to FIG. 3, but showing the power inlet of the charging circuit received within the connection portion of the adaptor.

The adaptor 40 also comprises two U-shaped springs 43 disposed therein respectively associated with the arc slots 42. The springs 43 has a first leg fixed to the adaptor 40 and a second leg extending across the arc slot 42 in such a manner that when the adaptor 40 is rotated relative to the power inlet 11 of the charging circuit 10 to have the pegs 12 moves along the arc slots, the pegs 12 are brought into contact with and deform the second legs of the springs 43 with respect to the first leg thereof. The deformed springs 43 apply forces on the pegs 12 to more securely hold the pegs 12 at the second ends of the arc slots 12. Preferably, the second legs of the springs 43 are provided with a notch or recessed section to receive the pegs 12 therein so as to even more securely hold the pegs 12 at the second ends of the arc slots 42, as shown in FIG. 4.

The power outlet 15 is provided to releasably connect to a battery holder 20 which has a battery receptacle section 21 for receiving and holding therein a battery 50 to be charged. The power outlet 15 is preferably provided with an extension cable 14 so as to provide flexibility in connecting the battery holder 20 to the charging circuit 10. In the embodiment illustrated, the power outlet 15 is designed as a plug receivable within a connection portion of the battery holder 20 which is defined by a socket 23 provided on the battery holder 20. The plug 15 is provided with a resilient retainer bar 16 which is resiliently movable or elastically deformable to release the connection of the plug 15 with the socket 23 of the battery holder 20. Such a plug-and-socket connection is common in telephone system so that no further description will be needed herein.

The battery holder 20 is provided with electrical contacts 22 located to be in electrical engagement with the battery 50 when the battery 50 is disposed within the receptacle 21. The electrical contacts 22 are electrically connected to the socket 23 for establishing an electrical engagement between the battery 50 and the charging circuit 10 via the plug-and-socket connection so as to supply electricity from the charging circuit 10 to the battery 50.

The battery holder 20 is configured for a particular battery 50 to be charged. For batteries of different specifications, battery holders of different configurations should be adapted. Alternatively, a universal design of the battery holder 20 may be provided for accommodating a variety of different batteries.

Figure 5:
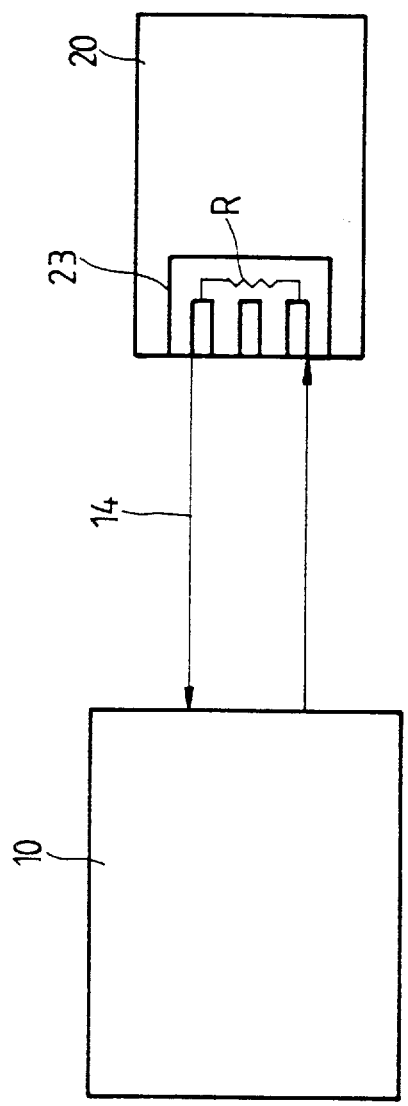
FIG. 5 is schematic view showing the resistor arranged within the socket of the adaptor.

With reference to FIG. 5, the battery holder 20 is provided with a resistor R, preferably inside the socket 23 so that when the charging circuit 10 is connected to the battery holder 20, the resistor R is connected in parallel with the power outlet of the charging circuit 10 to provide an automatic adjustment of the output voltage of the charging circuit 10 in correspondence to batteries of different specifications. The resistor R has a resistance selected in accordance with the battery to be charged so that the charging circuit 10 may be adapted in charging batteries of different specifications.

Figure 6:
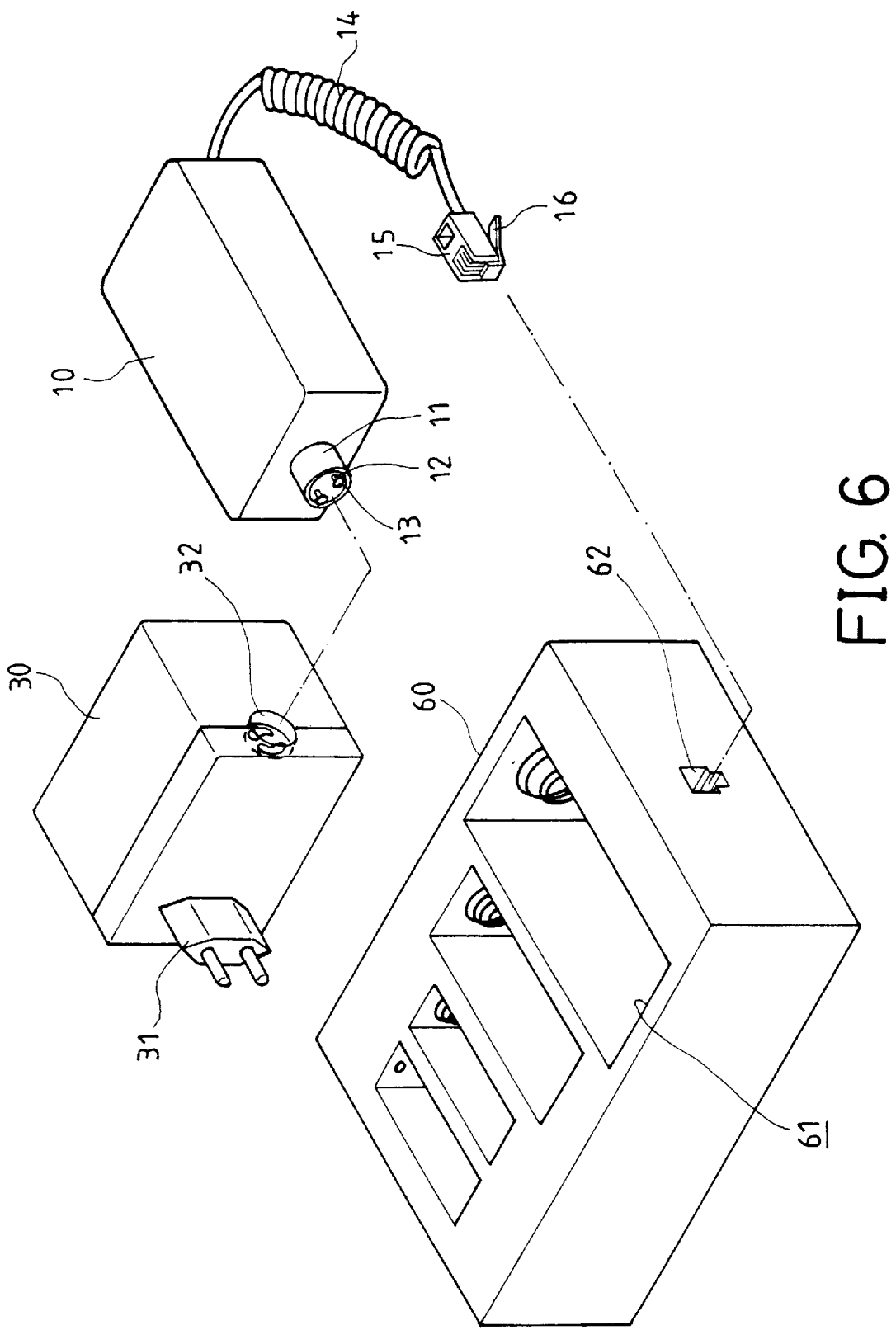
FIG. 6 is an exploded perspective view showing the charging device in accordance with a second embodiment of the present invention used to charge regular-sized cells.

Another embodiment of the present invention is shown in FIG. 6 wherein regular-sized batteries may be charged. The charging device in accordance with the second embodiment of the present invention comprises a charging circuit 10 having a power inlet 11 and a power outlet 15 having the same structure as that of the first embodiment discussed with reference to FIG. 1. An adaptor 30 which comprises a voltage transformer (not shown) is provided with a circular recess 32 for receiving and engaging the power inlet 11 of the charging circuit 10 in the same manner as described with reference to FIG. 1. The circular recess 32 has an identical structure as that of the adaptor 40 shown in FIG. 1. The adaptor 30 comprises a plug section 31 for inserting into and electrically engaging for example a wall outlet (not shown). Since the wall outlet and the automobile electricity system usually have different output voltage levels, the transformer that is included in the adaptor 30 is to provide the same level of voltage to the charging circuit 10.

The power outlet 15 of the charging circuit 10 also takes the form of a plug connected to the charging circuit 10 with a flexible cable 14 and receivable within a socket 62 formed on a battery holder 60. A retainer bar 16 is provided on the plug 15 for releasably retaining the plug 15 within the socket 62. The battery holder 60 is provided with a plurality of receptacles 61 which may be of different sizes for receiving therein batteries or cells of different sizes and to establish electrical connection between the batteries or cells and the charging circuit 10 via the connection of the plug 15 and the socket 62. With this arrangement, the charging device of the present invention may be adapted to charge batteries or cells of regular sizes with regular household electricity system, such as a wall outlet.

Although preferred embodiments have been described to illustrate the present invention, it is apparent that changes and modifications in the specifically described embodiments can be carried out without departing from the scope of the invention which is intended to be limited only by the appended claims.

What is claimed is:

1. A charging device comprising a charging circuit having a power inlet and a power outlet, an adaptor adapted to electrically connect to a given external power source and having a connection portion for releasable connection with the power inlet of the charging circuit and a battery holder having a connection portion for releasable connection with the power outlet of the charging circuit, the battery holder defining therein at least one battery receptacle for receiving and holding therein a battery to be charged, an electrical connection being established between the battery and the connection portion of the battery holder when the battery is received within the battery receptacle;

wherein the power inlet of the charging circuit comprises a cylindrical projection extending in an axial direction having an axial free end on which two pegs are provided, each having an expanded end, and wherein the connection portion of the adaptor comprises a circular recess sized to receive the cylindrical projection of the power inlet therein and allowing the cylindrical projection of the power inlet to be rotatable relative to the circular recess, the recess having a bottom defined by a plate member having two arc slots formed thereon, substantially concentric with the circular recess, to each receive one of the pegs therein, each of the arc slots having a first end having a first width large enough to allow the expanded end to extend axially therethrough so as to allow the peg to be guided by the arc slots to move toward a second end of the arc slot by rotating the cylindrical projection of the power inlet relative to the circular recess, the second end of the arc slot having second width smaller than the first width sa as to prevent the expanded end from axially moving therethrough and thus retaining the peg within the arc slot.

2. The charging device as claimed in claim 1, wherein the connection portion of the adaptor comprises a U-shaped spring associated with each of the arc slots, the U-shaped spring having a first leg fixed to the circular recess and a second leg extending across the arc slot so that when the peg is moved from the first end of the arc slot toward the second end, the peg is brought into contact with and deforms the second leg of the spring so as to have a force applied thereon by the spring to securely hold the peg at the second end of the arc slot.

3. The charging device as claimed in claim 2, wherein the second leg of the spring is provided with a recessed section into which the peg is received when the peg is located at the second end of the arc slot so as to more securely hold the peg at the second end of the arc slot.

\* \* \* \* \*